(12) United States Patent
Mayer et al.

(10) Patent No.: US 10,647,446 B2
(45) Date of Patent: May 12, 2020

(54) AIRCRAFT HAVING A WARNING DEVICE

(71) Applicant: Airbus Defense and Space GmbH, Taufkirchen (DE)

(72) Inventors: Marc Dominik Mayer, Taufkirchen (DE); Bastian Schäfer, Taufkirchen (DE)

(73) Assignee: Airbus Defence and Space GmbH (DE)

( * ) Notice: Subject to any disclaimer, the term of this patent is extended or adjusted under 35 U.S.C. 154(b) by 0 days.

(21) Appl. No.: 16/261,656

(22) Filed: Jan. 30, 2019

(65) Prior Publication Data
US 2019/0241280 A1    Aug. 8, 2019

(30) Foreign Application Priority Data

Feb. 6, 2018   (DE) ........................ 10 2018 102 583

(51) Int. Cl.
*B64D 47/06* (2006.01)
*B64C 39/02* (2006.01)
*B64D 45/00* (2006.01)

(52) U.S. Cl.
CPC ............ *B64D 47/06* (2013.01); *B64C 39/024* (2013.01); *B64D 45/00* (2013.01)

(58) Field of Classification Search
CPC ........ B64C 39/024; B64D 45/00; B64D 47/06
See application file for complete search history.

(56) References Cited

U.S. PATENT DOCUMENTS

| | | |
|---|---|---|
| 2,621,441 A | 12/1952 | Worden |
| 2,836,930 A | 6/1958 | Ragazzo et al. |
| 3,002,314 A | 10/1961 | Brottman |
| 5,083,799 A | 1/1992 | Thill |
| 6,083,127 A | 7/2000 | O'Shea |
| 9,738,398 B1 | 8/2017 | Wang et al. |
| 2003/0153234 A1 | 8/2003 | Hartman et al. |
| 2006/0128253 A1 | 6/2006 | Silverglate et al. |
| 2011/0061604 A1 | 3/2011 | Hill |
| 2017/0355469 A1 | 12/2017 | Canning |

FOREIGN PATENT DOCUMENTS

| | | |
|---|---|---|
| EP | 2840022 A1 | 2/2015 |
| WO | 2013/082669 A1 | 6/2013 |

*Primary Examiner* — Omeed Alizada
(74) *Attorney, Agent, or Firm* — Lerner, David, Littenberg, Krumholz & Mentlik, LLP

(57) ABSTRACT

An aircraft having a warning device for generating a whistling sound has a fuselage and a warning device. The warning device has a sound-generating element which is designed to generate a whistling sound if the aircraft is in an uncontrolled dive in the direction of the surface of the earth and there is a flow of fluid against the sound-generating element. The warning device is at least partially arranged on the fuselage of the aircraft.

12 Claims, 3 Drawing Sheets

AIRCRAFT HAVING A WARNING DEVICE

FIELD OF THE INVENTION

The invention relates to an aircraft. In particular, the invention relates to an aircraft having a warning device for generating a whistling sound.

BACKGROUND OF THE INVENTION

Unmanned aircraft, also referred to locally as drones, are continuously undergoing further development and are of interest for a wide variety of areas of application.

Efforts are being made, for example, to use such aircraft in logistics or in the delivery of mail. It is therefore to be expected that such aircraft will become more widespread and a large number of such aircraft will be in use in future. Since the flying routes can also run over (densely) populated areas, it is desirable to take suitable safety precautions, in order to warn people if the flying objects are damaged by internal and external influences and will fall to the ground.

BRIEF SUMMARY OF THE INVENTION

An aspect of the invention relates to making available an aircraft having a warning device which functions under virtually all operating conditions.

According to one aspect of the invention, an aircraft is disclosed which has a fuselage and a warning device. The warning device has a sound-generating element which is designed to generate a whistling sound when the aircraft is in an uncontrolled dive in the direction of the surface of the earth, and there is a flow of fluid against the sound-generating element. The warning device is arranged at least partially on the fuselage of the aircraft.

The fluid flows against the sound-generating element if the aircraft is in an uncontrolled dive. This can ensure that even in the event of a power loss an acoustic warning signal is generated as a whistling sound, in order to warn persons about the falling aircraft.

The fuselage relates to the essential structural features of the aircraft. The fuselage has, for example, a core structure, wings, drive units and an outer skin, wherein the core structure is that element to which the other parts of the fuselage are attached.

The fluid can also be referred to as air or gas.

The whistling sound relates to a sound which is generated by virtue of the fact that a flow of air is divided or deflected or diverted by a sharp edge or a similar obstacle, as a result of which eddies are produced which, through interaction with a cavity, generate a soundwave.

The cavity can also be referred to as a resonator space.

A multiplicity of sound-generating elements can be arranged at various locations on the fuselage, in particular on the outer skin of the aircraft. In this context, the sound-generating element can preferably be attached at locations on the outer skin of the aircraft in such a way that in an uncontrolled dive of the aircraft a flow of air flows against the sound-generating element.

The direction in which the oncoming flow of fluid flows relates to a direction of flow which flows basically perpendicularly onto the falling aircraft when viewed from the surface of the earth.

In the event of the aircraft falling in a dive with its nose in the direction of the surface of the earth, the longitudinal axis of the aircraft is basically perpendicular with respect to the surface of the earth. In this example, the oncoming flow of fluid flows in the direction of the longitudinal axis, with the result that the sound-generating element is arranged in such a way that the oncoming flow of fluid flows against it.

The longitudinal axis of the aircraft can also be referred to as the x direction. The transverse axis of the aircraft can also be referred to as the y direction. The vertical axis of the aircraft can also be referred to as the z direction.

In the event of the aircraft spinning, there is a non-uniform flow of the fluid against the outer skin. Therefore, in this example a plurality of sound-generating elements can be arranged in different directions along the outer skin, in order to ensure that the fluid for generating the whistling sound flows against the sound-generating element even in the case of a spinning aircraft.

The sound-generating element can therefore ensure that a whistling sound is generated by an oncoming flow. A power supply is not necessary to generate the whistling sound. As a result, the whistling sound can be output even when there is a complete power loss of the aircraft.

Furthermore, the aircraft can, however, also have further sound sources. In one example, the aircraft can have a loudspeaker which generates a warning sound. The loudspeaker can be connected to a power supply source of the aircraft. The power supply of the loudspeaker can also be embodied by means of a battery, with the result that the loudspeaker can emit a warning sound even in the event of a power loss.

According to one embodiment, the sound-generating element is a recess in the outer skin of the aircraft. The sound-generating element can as a result be designed so as to be at least partially integrated in the outer skin of the aircraft. For example, an inner wall which runs parallel to the outer wall can be arranged on the outer skin, in order to form a cavity between the outer skin and the inner wall. Alternatively, the outer skin can be of double-walled design at this point. The inner wall can be connected to the outer skin by means of connecting fins. The fluid can flow via an inlet into the cavity formed by the outer skin and the inner wall, and can flow out of an outlet again. Such an embodiment has the advantage that the aerodynamic properties of the aircraft are not adversely affected, or at most are adversely affected only to a small degree.

According to another embodiment, the sound-generating element is a projection on the outer skin of the aircraft. In one example, the sound-generating element can be mounted on the outer skin of the aircraft, for example screwed, riveted, welded or bonded, or else as a combination of a plurality of types of attachment, e.g. screwed and bonded. As a result, a simple method of manufacture and maintenance can be attained because the sound-generating element is easily mounted on the outer skin and can also be used as a retrofitting kit for existing aircraft.

According to one embodiment of the invention, the sound-generating element has an inlet and a cavity and/or an outlet. The geometric dimensions of the inlet, of the cavity and of the outlet can be embodied as a function of the desired frequency. In one example, the sound-generating element can be dimensioned in such a way that a whistling sound is generated in a frequency range which can be perceived by humans, e.g. between several hundred Hz up to 20 kHz. It is possible that the sound-generating element is merely a depression in the form of a blind hole and that the upper edges of the blind hole are shaped in such a way that a fluid which flows past the blind hole gives rise to a whistling sound. In this case, the sound-generating element does not have an outlet and there is no flow through the cavity. The fluid merely flows past an opening of the blind hole and is deflected by the edges on the opening of the blind hole in order to generate the whistling sound.

According to a further embodiment of the invention, the sound-generating element is embodied as a whistle for generating a whistling sound. In one example, the cavity of the whistle can be a tubular cavity which runs either outside the aircraft or inside the aircraft, along the outer skin. The fluid flows against the inlet of the whistle and flows out of the outlet of the whistle again via the cavity, with the result that a whistling sound is generated.

According to a further embodiment of the invention, the warning device has a blocking apparatus. As a result, it can be ensured that the whistling sound does not generate a whistling sound during the planned flight. In addition it can be ensured that the sound-generating element is not soiled and is capable of use where necessary. The blocking apparatus can also be referred to as a protection device and is, in particular, embodied in a closed or blocked state to prevent a flow of fluid getting through to the sound-generating element. The blocking apparatus can in addition also assume an opened state. In the opened state, a fluid, for example air, can get through to the sound-generating element and generate the whistling sound.

According to a further embodiment of the invention, the blocking apparatus has a shutter and a securing element, wherein the securing element is embodied in such a way that the shutter closes the sound-generating element by means of the securing element if the aircraft is in controlled flight, in order to prevent the flow of fluid from flowing against the sound-generating element in order to generate a whistling sound.

According to a further embodiment of the invention, the securing element is embodied in such a way that the shutter opens if the aircraft is in an uncontrolled dive in the direction of the surface of the earth, in order to permit the flow of fluid to flow against the sound-generating element, in order to generate a whistling sound.

According to a further embodiment of the invention, the blocking apparatus is arranged at the inlet and/or inside the cavity and/or at the outlet of the sound-generating element.

According to a further embodiment of the invention, the securing element has an elastic element, in order to secure the shutter in a closed state. The elastic element is dimensioned in such a way that the shutter opens starting from a specific pressure, wherein the specific pressure occurs in the case of an uncontrolled dive of the aircraft in the direction of the surface of the earth. In one example, the securing element yields starting from a certain air pressure, with the result that the shutter is moved from the closed state into the opened state. The specific air pressure occurs in the case of an uncontrolled dive of the aircraft in the direction of the surface of the earth. In one example, when there is a flow against the shutter starting from a certain air pressure into the cavity the shutter can fold or clear the opening in the sound-generating element and therefore allow the oncoming flow of fluid into the cavity.

In a further example, the blocking apparatus can also have an acceleration-detection unit which detects an acceleration pattern which is typical of a dive of the aircraft and is coupled to the securing element in such a way that the shutter opens.

According to a further embodiment, the securing element has a magnetic element, in order to secure the shutter in a closed state. The magnetic element is dimensioned in such a way that the shutter opens when there is a powerloss, i.e. the magnetic element is dimensioned in such a way that in the event of a powerloss the securing element no longer secures the shutter in the closed state. The magnetic element secures the shutter in the closed state as long as the magnetic element is supplied with power. In the event of a power loss or power failure, the magnetic element loses its effect and the shutter is no longer secured in the closed state and opens. As a result it is ensured that in the event of a power loss there can be a flow against the sound-generating element if the aircraft is in an uncontrolled dive.

According to a further embodiment of the invention, the blocking apparatus has a film. The film is embodied in such a way that the film tears if there is a flow with a specific air pressure against the film, wherein the specific air pressure occurs when there is an uncontrolled dive of the aircraft in the direction of the surface of the earth. The film can preferably be arranged at an inlet of the sound-generating element. This has the advantage that the film is easily accessible and can easily be replaced where necessary or can be checked for its functional capability before each flight, e.g. it can be checked for leakproofness or correct seating at the inlet of the sound-generating element.

In another example, a further blocking apparatus can also additionally be attached to the outlet of the sound-generating element. As a result, the sound-generating element can be protected against the penetration of moisture and dirt both at the inlet and at the outlet.

According to a further embodiment, in each case at least one warning device is arranged in an x direction, in a y direction and in a z direction of the aircraft. This means that the warning devices are arranged in such a way that they generate the whistling sound if the flow of air or another flow of fluid flows in the x direction, y direction or z direction. In one example, the warning device is arranged in such a way that in the case of an uncontrolled dive there is a flow of air against the warning device in every position and direction of movement. As a result, it can be ensured that the whistling sound is generated in every position and direction of movement of the aircraft in the air if the aircraft is in an uncontrolled dive. For example, if the aircraft is spinning, the warning device can be arranged on the outer skin in such a way that the whistling sound is generated by the airflow by at least one warning device in every position and direction of movement of the aircraft.

According to a further embodiment, the aircraft is an unmanned aircraft. In one example, the aircraft can be a drone with a weight of less than 25 kg.

BRIEF DESCRIPTION OF THE DRAWINGS

In the text which follows, exemplary embodiments of the invention will be described with reference to the figures, of which.

DETAILED DESCRIPTION

The illustrations in the figures are schematic and are not true to scale.

If identical reference symbols are used in the following description of the figures, they relate to identical or similar elements.

Figure 1:
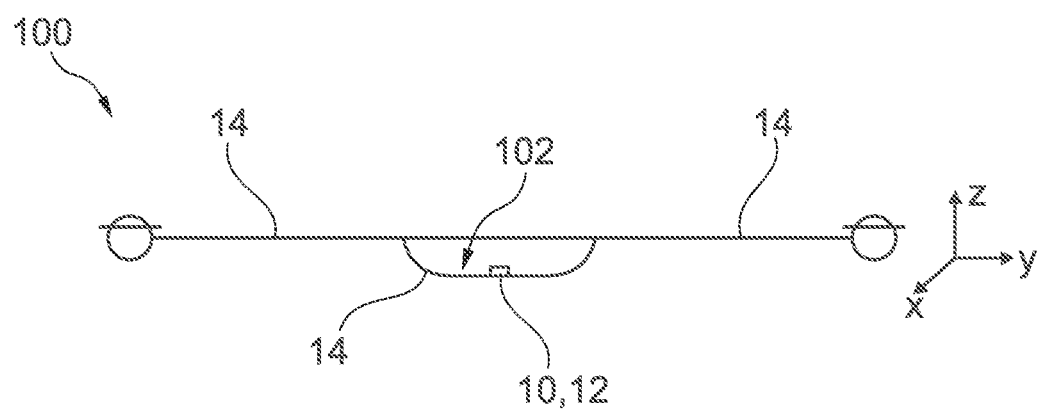
FIG. 1 shows a schematic illustration of an aircraft having a warning device according to an exemplary embodiment of the invention.

FIG. 1 shows an aircraft 100 having a fuselage 102. The aircraft has a warning device 10. The warning device 10 has a sound-generating element 12 which is designed to generate a whistling sound if the aircraft 100 is in an uncontrolled dive in the direction of the surface of the earth and there is a flow of fluid against the sound-generating element 12. The warning device 10 is at least partially arranged on the fuselage 102 of the aircraft.

In the example shown here, the warning device 10 is arranged on the fuselage 102. The warning device 10 can, however, be arranged at any desired location on an outer skin 14 of the aircraft. In an example which is not shown, the warning device 10 can be arranged on the outer skin 14 of the wings of the aircraft. Furthermore, a plurality of warning devices can be arranged on the outer skin 14 of the aircraft 100. The warning devices 10 can be arranged in such a way that the airflow in the case of an uncontrolled dive of the aircraft can flow against at least one warning device 10. For example, the warning device can be arranged in such a way that the longitudinal axis of the warning device runs along the longitudinal axis of the aircraft (x direction) on the outer skin 14 of the aircraft, with the result that in the case of a dive there is a flow against the warning device, in order to generate the whistling sound, if the aircraft falls nose down in the direction of the surface of the earth. As a result it is ensured that depending on the position and the direction of movement of the aircraft 100 in a dive there is a flow against at least one warning device 10 in such a way that a whistling sound is generated. The longitudinal axis of the aircraft can also be referred to as the x direction. The transverse axis of the aircraft 100 can also be referred to as the y direction. The vertical axis of the aircraft 10 can also be referred to as the z direction.

Figures 2A, 2B:
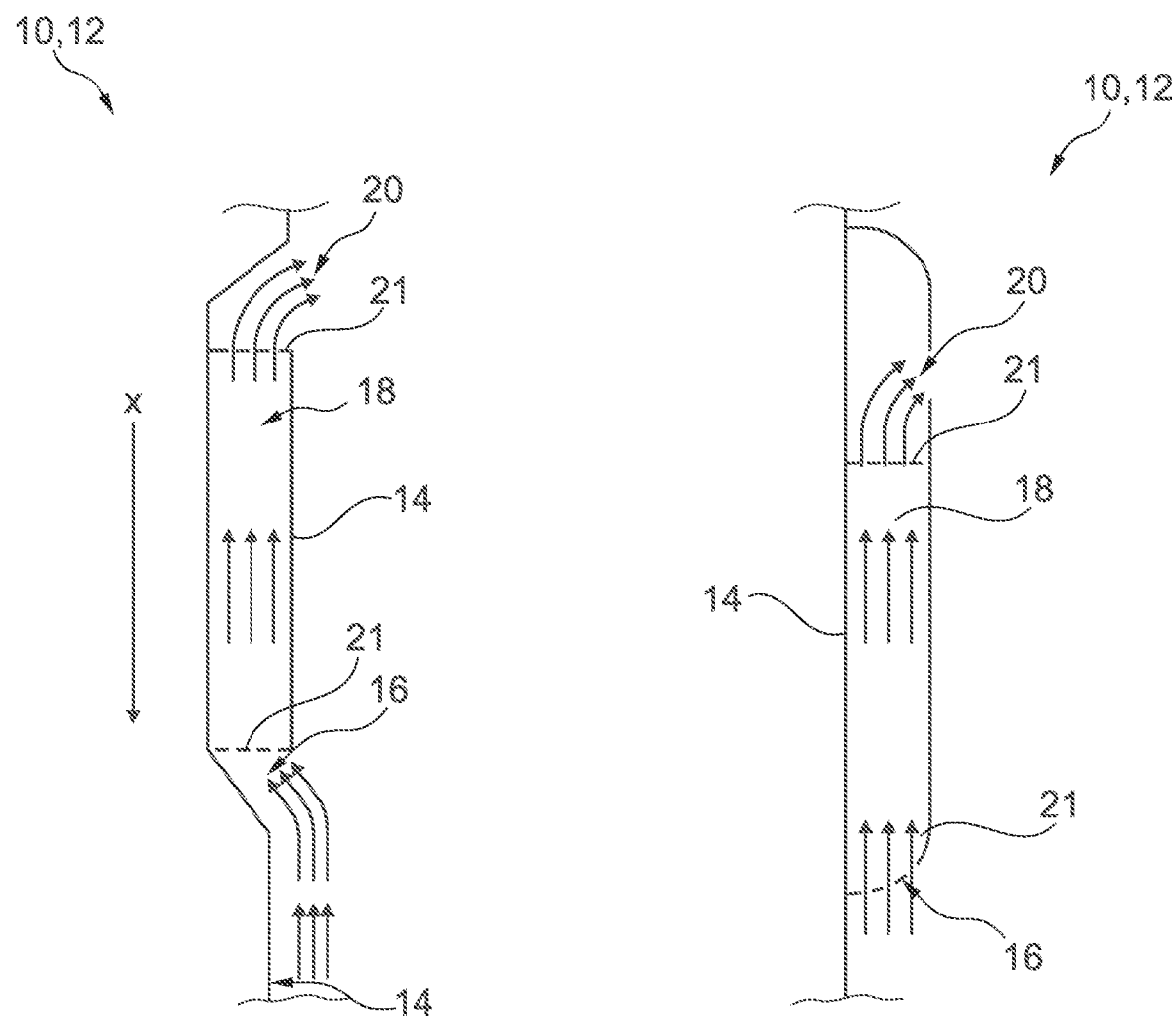
FIG. 2a shows a schematic illustration of the warning device of an aircraft according to an exemplary embodiment of the invention.
FIG. 2b shows a schematic illustration of the warning device of an aircraft according to a further exemplary embodiment of the invention.

FIGS. 2a and 2b show exemplary embodiments of the sound-generating element 12 of the warning device 10 of the aircraft 100 (FIG. 1), which sound-generating element 12 is arranged, for example, along the longitudinal axis (x direction) of the aircraft 100 and against which the air flow flows (shown schematically by the upwardly directed arrows) during an uncontrolled dive in the direction of the surface of the earth. In the schematic illustration in FIG. 2a and FIG. 2b the aircraft 100 is falling vertically in the direction of the surface of the earth, i.e. the longitudinal axis of the aircraft 100 is positioned perpendicularly relative to the surface of the earth.

The sound-generating element 12 can be embodied, for example as a whistle for generating a whistling sound. In one example, a cavity 18 of the whistle can be a tubular cavity which runs along the outer skin 14 either outside the aircraft 100 or inside the aircraft 100. The airflow flows into an inlet 16 of the sound-generating element 12 and flows out of an outlet 20 again via the cavity 18, with the result that a whistling sound is generated.

In the example shown in FIG. 2a, the sound-generating element 12 is a recess in the outer skin 14 of the aircraft 100 (FIG. 1). As a result, the sound-generating element 12 can be embodied partially integrated into the outer skin 14 of the aircraft 100. For example, a parallel inner wall can run on the outer skin 14, in order to form a cavity 18 between the outer skin 14 and the inner wall. In one example, reinforcement fins 21 (generally a carrying or supporting structure) can be arranged between the inner wall and the outer skin, in order to attach the outer skin to the inner wall. The fluid can flow via an inlet 16 into the cavity 18 formed by the outer skin 14 and the inner wall, and flow out via an outlet 20. Such an embodiment has the advantage that the aerodynamic properties of the aircraft are not adversely affective or are at most adversely affected to a small degree. A whistling sound is generated at the sound-generating element 12 by the airflow. The reinforcement fins 21 are embodied and arranged in such a way that they do not adversely affect, or hardly adversely affect, the airflow between the inlet and outlet.

FIG. 2b shows a further example of the sound-generating element 12. In the example shown here, the sound-generating element 12 is embodied as a projection on the outer skin of the aircraft 100. In one example, the sound-generating element 12 can be welded or bonded to the outer skin 13 of the aircraft 100. As a result, a simple manufacturing method and maintenance can be attained. In other words, the sound-generating element 12 can be a tubular structure with the cavity 18, the inlet 16 and the outlet 20, which tubular structure is attached to the outer skin 14 of the aircraft or integrated in the outer skin 14. The inlet 16 is illustrated by a dashed line, in order to clarify that the inlet is opened. The dashed line merely constitutes a line of sight.

A whistling sound is generated by the flowing of a flow of air against the sound-generating element 12 of the aircraft 100. As a result it can be ensured that in the event of a power loss the aircraft 100 can emit a warning signal in the case of a dive, in order to warn persons on the ground. In an example which is not shown here, further sound sources for outputting warning signals can also be arranged on the aircraft. For example, loudspeakers can be arranged on the aircraft. Said loudspeakers can be connected to a power supply source of the aircraft or can be operated by means of a separate redundant energy source (e.g. batteries). The supply of the loudspeakers via batteries has the advantage that the loudspeaker can output further warning sounds in addition to the whistling sound in the event of a power loss.

Figure 3A:
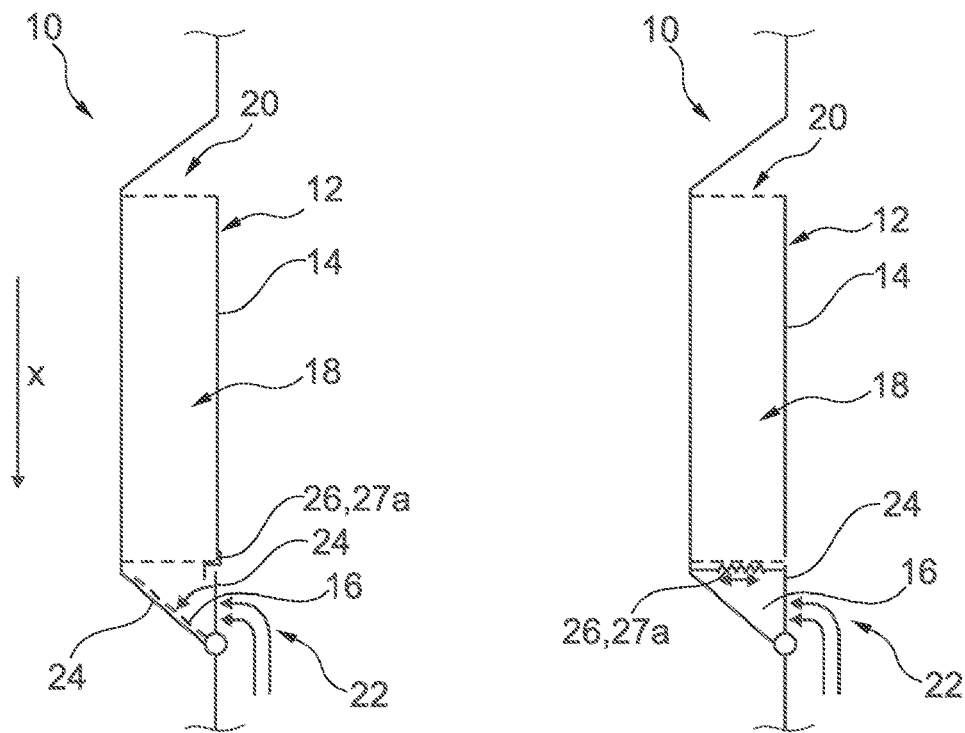
FIG. 3a shows a schematic illustration of two variants of the warning device of an aircraft having a blocking apparatus according to an exemplary embodiment of the invention.
Figure 3B:
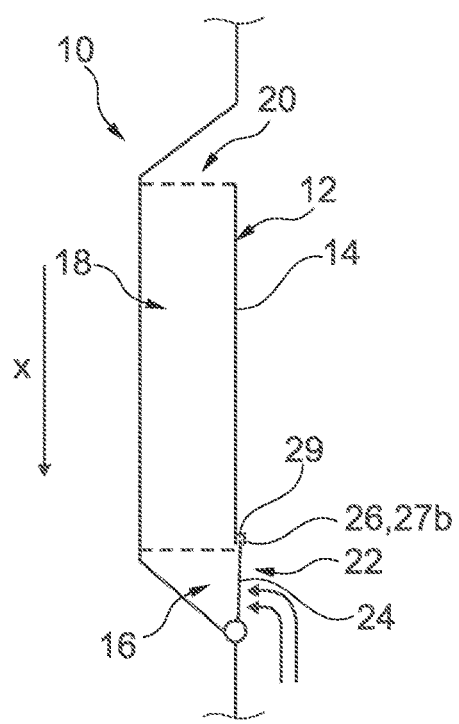
FIG. 3b shows a schematic illustration of the warning device of an aircraft having a blocking apparatus according to a further exemplary embodiment of the invention.
Figure 3C:
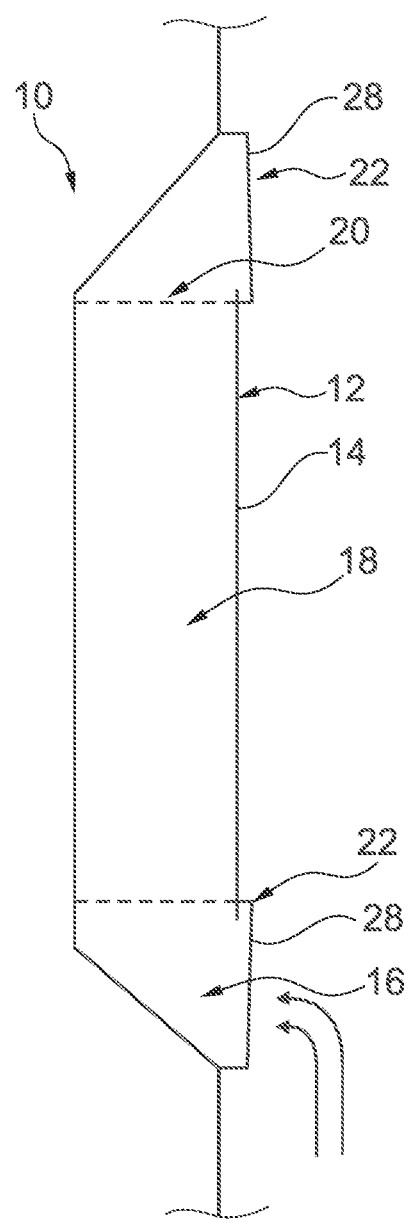
FIG. 3c shows a schematic illustration of the warning device of an aircraft having a blocking apparatus according to a further exemplary embodiment of the invention.

FIG. 3a, FIG. 3b and FIG. 3c show schematic illustrations of exemplary embodiments of the warning device 10. The warning device 10 has a blocking apparatus 22. The blocking apparatus blocks the airflow through the cavity 18 and can be arranged either on the inlet or on the outlet or on both. As a result it can be ensured that the whistling sound does not generate a whistling sound during a planned flight, i.e. in controlled flight. In addition, it can be ensured that the sound-generating element 12 is not soiled and is and remains capable of use when required.

In one example, as shown, for example, in FIG. 3a and FIG. 3b, the blocking device 22 has a shutter 24 and a securing element 26, wherein the securing element 26 is embodied in such a way that the shutter 24 blocks the sound-generating element 12 by means of the securing element 26 if the aircraft 100 is in controlled flight, in order to prevent the fluid flow from flowing against the sound-generating element 12 in order to generate a whistling sound. Furthermore, the securing element 26 is embodied in such a way that the shutter 24 opens the sound-generating element 12 by means of the securing element 26 if the aircraft 100 is in an uncontrolled dive in the direction of the surface of the earth, in order to permit the fluid flow to flow against the sound-generating element 12 in order to generate a whistling sound. The blocking device is therefore a purely passive element and is moved into the opened state by the fluid flow if the fluid pressure acting on the blocking apparatus exceeds a specific threshold value or if the aircraft exceeds a specific speed.

The blocking device 22 can be arranged on the inlet 16 and/or inside the cavity and/or on the outlet 20 of the sound-generating element 20. In FIG. 3a and FIG. 3b, the blocking apparatus 22 is arranged at the inlet 16. In FIG. 3c, the blocking apparatus 22 is arranged at the outlet 20.

FIG. 3a shows two warning devices with a similar functional principle. On the left-hand side, a securing element 26 secures the shutter in the closed state. Once the shutter opens, it also remains in the opened state because the securing element no longer applies any force to the shutter after the opening. On the right-hand side, the securing element 26 (e.g. a compression spring) continuously applies a compressive force to the shutter and counteracts the fluid pressure. Here, the shutter can be opened by the fluid pressure and is closed again by the securing element 26 if the fluid pressure decreases.

In both variants in FIG. 3a, the securing element 26 has an elastic element 27a, in order to secure the shutter 24 in a closed state. The elastic element 27a is dimensioned in such a way that the securing element 26 no longer secures the shutter 24 in the closed state starting from a specific air pressure, wherein the specific air pressure occurs in the case of an uncontrolled dive of the aircraft 100 in the direction of the surface of the earth. In one example when the airflow flows against the shutter 24 the shutter 24 can fold into the cavity 18 starting from a specific air pressure (see dashed illustration of shutter 24) and can therefore allow the oncoming fluid to flow into the cavity 18. In one example, the elastic element 27a can be a wound leaf spring which is attached at one end to the outer skin 18 of the aircraft 100. For example, the shutter 24 can bear on the other end of the leaf spring. If, for example, a specific air pressure is present which corresponds to a pressure which is applied to the shutter in the case of a dive, the leaf spring yields and the shutter 24 folds into the cavity 18 of the sound-generating element 12. The folded-in shutter 24 is shown by the dashed line. If the shutter 24 is folded in, the airflow can flow into the sound-generating element 12, and a whistling sound is generated. In a further example, the elastic element can also be a conventional spring, in particular a compression spring, 27a (see second schematic illustration on the right-hand side of FIG. 3a) which is attached to the inner wall, and secures the shutter 24 from the inside. When the specific air pressure described above occurs, the spring yields, and an airflow can flow against the sound-generating element 12.

In one example, as is illustrated schematically by way of example in FIG. 3b, the securing element 26 has a magnetic element 27b, in order to secure the shutter 24 in a closed state. The magnetic element 27b is dimensioned in such a way that in the event of a power loss the securing element no longer secures the shutter in a closed state, i.e. the magnetic element 27b secures the shutter 24 in the closed state as long as the magnetic element is supplied with power. In the event of a power loss or power failure, the magnetic element loses its effect and the shutter is no longer secured in the closed state and drops into an opened state. For example, the shutter 24 tilts away along the outer skin, i.e. the shutter 24 is mounted in such a way that the shutter 24 rotates for example into the plane of the drawing or out of the plane of the drawing along the outer skin 14, with the result that the inlet 16 of the sound-generating element 12 is opened. In one example, a sliding layer 29 (e.g. a Teflon coating) could be arranged on the magnetic element 27b or on the outer skin of the fuselage, with the result in the case of a power failure the shutter 24 can rotate away more easily. In another example, it is also possible to provide the shutter on one side with a weight or a tension spring or a compression spring, in order to permit or assist a rotational movement of the shutter into the plane of the drawing or out of the plane of the drawing, as soon as the magnetic effect of the magnetic element 27b has ceased.

In a further schematic illustration of the sound-generating element 12 in FIG. 3c, the blocking apparatus 22 is a film 28. The film 28 is embodied in such a way that the film tears if there is a flow with a specific pressure against the film, wherein the specific air pressure occurs when there is an uncontrolled dive of the aircraft in the direction of the surface of the earth or if a specific speed value is exceeded. This specific speed value is dimensioned in this and in other exemplary embodiments in such a way that it preferably does not occur in the normal flying mode but only when there is an at least partially uncontrolled dive.

The film can preferably be arranged at the inlet 16 of the sound-generating element 12. In one example, the film can be bonded onto the outer skin 14. This has the advantage that the film is easily accessible and can easily be replaced when necessary, or its functional capability can be checked before each flight. For example, the film 24 can be checked for leakproofness or for correct seating at the inlet 16 and/or outlet 20 of the sound-generating element 12. In the example shown here, the film 28 can also additionally be attached to the outlet 20 of the sound-generating element 12. As a result, the sound-generating element 12 can be additionally protected against the penetration of moisture and dirt.

The embodiments in FIG. 3a to FIG. 3c can be combined (not shown). The elastic element 27a, the magnetic element 27b and the film 28 can, for example, be arranged together on the sound-generating element 12. In this example, the film can ensure additional sealing of the elastic element 27a and of the magnetic element 27b. In one example, the attachment of the film 28 could be designed in such a way that an airflow tears the film off, and in a subsequent step the airflow flows against the elastic element and the magnetic element in such a way that the inlet is opened.

In addition, it is to be noted that "comprising" does not exclude any other elements or steps and "one" or "a" does not exclude a plurality. In addition, it is to be noted that features or steps which have been described with reference to one of the above exemplary embodiments can also be used in combination with other features or steps of other exemplary embodiments described above. Reference numbers in the claims are not to be considered restrictive.

LIST OF REFERENCE NUMBERS

10 Warning device
12 Sound-generating element
14 Outer skin
16 Inlet
18 Cavity
20 Outlet
21 Reinforcement fins
22 Blocking apparatus
24 Shutter
26 Securing element
27a Elastic element
27b Magnetic element
28 Film
29 Sliding layer 100 Aircraft
102 Fuselage While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft comprising:
   a fuselage; and
   a warning device having a blocking apparatus;
   wherein the warning device has a sound-generating element configured to generate a whistling sound when the aircraft is in an uncontrolled dive in the direction of the surface of the earth, and there is a flow of fluid against the sound-generating element,
   wherein the warning device is arranged at least partially on the fuselage of the aircraft,
   wherein the blocking apparatus has a shutter and a securing element, wherein the securing element is embodied in such a way that the shutter closes the sound-generating element by the securing element if the aircraft is in controlled flight.

2. The aircraft according to claim 1, wherein the sound-generating element is a recess in an outer skin of the aircraft.

3. The aircraft as claimed in claim 1, wherein the sound-generating element has an inlet and a cavity and/or an outlet.

4. The aircraft as claimed in claim 1, wherein the sound-generating element is embodied as a whistle for generating a whistling sound.

5. The aircraft according to claim 1, wherein the securing element is embodied in such a way that the shutter opens if the aircraft is in an uncontrolled dive in the direction of the surface of the earth, in order to permit the flow of fluid to flow against the sound-generating element, in order to generate a whistling sound.

6. The aircraft according to claim 1, wherein the blocking apparatus is arranged at the inlet and/or inside the cavity and/or at the outlet of the sound-generating element.

7. The aircraft according to claim 1, wherein the securing element has an elastic element, in order to secure the shutter in a closed state, and
   wherein the elastic element is dimensioned in such a way that the shutter opens starting from a specific pressure, wherein the specific air pressure occurs in the case of an uncontrolled dive of the aircraft in the direction of the surface of the earth.

8. The aircraft according to claim 5,
   wherein the securing element has a magnetic element, in order to secure the shutter in a closed state, and
   wherein the magnetic element is dimensioned in such a way that the shutter opens when there is a powerloss.

9. The aircraft according to claim 1,
   wherein the blocking apparatus has a film, and
   wherein the film is embodied in such a way that the film tears if there is a flow with a specific pressure against the film wherein the specific air pressure occurs when there is an uncontrolled dive of the aircraft in the direction of the surface of the earth.

10. The aircraft according to claim 1, wherein in each case at least one warning device is arranged in an x direction, in a y direction and in a z direction of the aircraft.

11. The aircraft according to claim 1, wherein the aircraft is an unmanned aircraft.

12. The aircraft according to claim 1, wherein the sound-generating element is a projection on the outer skin of the aircraft.

* * * * *